(12) United States Patent
Rivera (10) Patent No.: US 8,812,579 B2
(45) Date of Patent: Aug. 19, 2014

(54) APPARATUS FOR TRANSFERRING DATA VIA A PROXY SERVER AND AN ASSOCIATED METHOD AND COMPUTER PROGRAM PRODUCT

(75) Inventor: John Rivera, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1053 days.

(21) Appl. No.: 11/614,531

(22) Filed: Dec. 21, 2006

(65) Prior Publication Data

US 2008/0155067 A1   Jun. 26, 2008

(51) Int. Cl.
*G06F 15/16* (2006.01)
*G06F 15/177* (2006.01)

(52) U.S. Cl.
USPC ........... 709/202; 709/203; 709/220; 709/227; 713/201; 705/38

(58) Field of Classification Search
USPC .................. 709/202, 203, 220, 227; 713/201; 705/38
See application file for complete search history.

(56) References Cited

U.S. PATENT DOCUMENTS

| | | | |
|---|---|---|---|
| 6,208,640 B1 * | 3/2001 | Spell et al. | 370/358 |
| 6,510,464 B1 * | 1/2003 | Grantges et al. | 709/225 |
| 6,785,255 B2 * | 8/2004 | Sastri et al. | 370/338 |
| 7,321,926 B1 * | 1/2008 | Zhang et al. | 709/220 |
| 7,333,990 B1 * | 2/2008 | Thiagarajan et al. | 1/1 |
| 2003/0069839 A1 * | 4/2003 | Whittington et al. | 705/38 |
| 2003/0110257 A1 * | 6/2003 | Hyun et al. | 709/224 |
| 2003/0236905 A1 * | 12/2003 | Choi et al. | 709/231 |
| 2004/0024808 A1 * | 2/2004 | Taguchi et al. | 709/203 |
| 2004/0073629 A1 * | 4/2004 | Bazot et al. | 709/217 |
| 2004/0268150 A1 * | 12/2004 | Aaron | 713/201 |
| 2005/0108517 A1 * | 5/2005 | Dillon et al. | 713/150 |
| 2005/0119967 A1 * | 6/2005 | Ishiguro et al. | 705/38 |
| 2005/0187834 A1 * | 8/2005 | Painter et al. | 705/28 |
| 2005/0271051 A1 * | 12/2005 | Holloway et al. | 370/389 |
| 2006/0064750 A1 * | 3/2006 | Kersey et al. | 726/14 |

* cited by examiner

*Primary Examiner* — Liangche A Wang
*Assistant Examiner* — John Isom (57) ABSTRACT

An apparatus is provided for transferring data among clients, recipients, and servers. In general, an apparatus is described for coordinating and modifying data being transferred from clients to destination servers and from destination servers to recipients. A proxy server modifies requests and responses from clients and destination servers, respectively, and ultimately communicates related responses to recipients according to one or more predefined rules pertaining to each client and destination server. In this way, requests may be communicated from clients to the appropriate destination servers such that the requests may be fulfilled by the destination servers, and responses may be communicated from the destination servers to the appropriate recipients. The load on potential destination servers, network conditions, and the content of the responses received may be considered and addressed by the proxy server, facilitating the transfer of data.

24 Claims, 3 Drawing Sheets

FIG 3

APPARATUS FOR TRANSFERRING DATA VIA A PROXY SERVER AND AN ASSOCIATED METHOD AND COMPUTER PROGRAM PRODUCT

BACKGROUND

Proxy servers are used in many contexts to allow clients to make indirect network connections to other network services. In general, a proxy server is a computer that acts as an intermediary between a client application, such as a web browser, and a destination server that will service the client. Typically, a client communicates a request to the proxy server and the proxy server fulfills the request by relaying the request to a different server and then relaying the response from that other server back to the client. A client may request a connection to a particular server connected to the network, a file, or any other resource available on a different server. In some cases, the proxy server may satisfy the request without relaying the request to a different server, such as by providing a file from the proxy server's own cache.

Many different types of proxy servers exist having specialized functions. For example, a web proxy may provide a cache of web pages and files that are available on remote web servers so that local network clients may access the cached resources more efficiently, quickly, or reliably. Similarly, an intercepting proxy may provide enforcement of network use policies (e.g., restrictions on websites that may be viewed) or security, anti-malware (i.e., hostile, intrusive, or annoying software or program code), and/or caching services.

A reverse proxy is generally a proxy server that routes request from clients communicating over a packet-switching network, such as the Internet, to a destination server. Reverse proxies may be used to provide security for the destination servers, apply encryption, or distribute the load of client requests to several servers, among other functions.

Requests received by proxy servers often require conversion to a different form in order for the request to be understood by a destination server and elicit a valid response. Responses from destination servers may also require conversion or modification in order to be understood by the client. For example, a request communicated via Hypertext Transfer Protocol (HTTP) may need to be converted to a Hypertext Transfer Protocol Secure (HTTPS) format for transmittal to a destination server residing outside a firewall. Similarly, the header of a request or response may need to be modified to make the request compatible with the destination server, or the response compatible with the client.

Other conditions may also exist affecting the efficiency and reliability of a network. For example, certain destination servers may be overloaded with requests, whereas other servers, which may have information that is identical to that contained on the overloaded servers, may be experiencing light traffic. Similarly, some of the servers may be off-line or experiencing problems, making them unavailable to respond to requests. However, these conditions may dissipate at some point thereafter, making the previously unavailable servers once again capable of responding to requests. Inefficient use of a network because of these and other issues can generate significant losses as a result of time wasted by waiting for slow responses, system failures, and the receipt of inaccurate or worthless data.

Thus, there is a need for an apparatus that promotes the accurate and efficient transfer of data among clients, servers, and recipients and receives requests from clients and responses from servers via both secure or non-secure connections.

DETAILED DESCRIPTION OF PREFERRED EMBODIMENTS

Exemplary embodiments now will be described hereinafter with reference to the accompanying drawings, in which exemplary embodiments and examples are shown. Like numbers refer to like elements throughout.

Apparatuses and methods for transferring data among clients, servers, and recipients are provided in accordance with various exemplary embodiments. In general, apparatuses and methods are described for modifying requests received from clients according to predefined rules, providing related requests to destination servers in accordance with the rules, modifying responses received from the destination servers according to the rules, and providing related responses to recipients. A proxy server modifies the requests and responses from clients and destination servers, respectively, and ultimately communicates related responses to recipients according to one or more predefined rules pertaining to each client and destination server. In this way, requests may be communicated from clients to the appropriate destination servers such that the requests may be fulfilled by the destination servers, and responses may be communicated from the destination servers to the appropriate recipients, facilitating the transfer of data.

Furthermore, some responses received from destination servers may need to be transmitted to a recipient other than the requesting client to facilitate certain network functions. For example, a request for a file may be generated by one system acting as a client, but the file received through a response from a destination server may ultimately require processing by a different system. Returning the requested file to the original client in this case may delay the receipt of the file by the system that actually requires the file, incurring costs that could have been avoided if the response had been transmitted directly from the destination server to the recipient ultimately responsible for processing the response.

Figure 1:
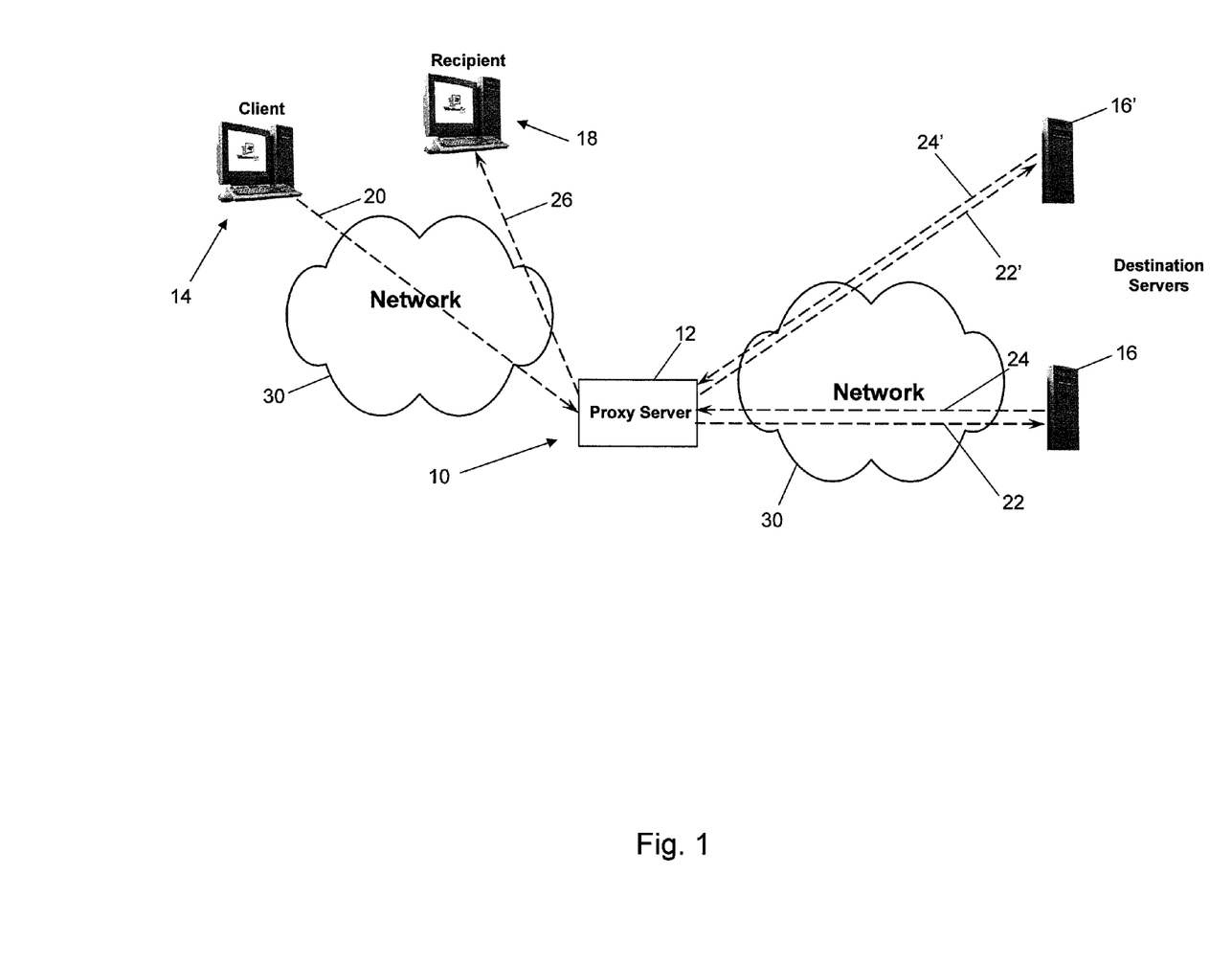
FIG. 1 is a schematic representation of one embodiment of an apparatus for transferring data between a client, destination servers, and a recipient.

Referring to FIG. 1, the apparatus 10 comprises a proxy server 12 configured to receive a request 20 from a client 14 and provide a related request 22 to a destination server 16. The proxy server 12 is also configured to receive a response 24 from the destination server 16 to which the related request 22 was provided and to provide a related response 26 to a recipient 18. The proxy server 12 may be configured to communicate with clients 14, destination servers 16, and recipients 18 over one or more packet-switching networks 30, such as Internet Protocol (IP) networks.

Using the context of a telephone service provider as an example and referring to FIG. 1, the proxy server 12 may receive a request 20 from a client 14, such as a Voice Response Unit (VRU), for long distance call records/IP session records. The request 20 may be communicated to the proxy server 12 using a certain communications protocol, such as HTTP, and may specify a particular destination server 16, such as a Call Agent, to fulfill the request 20.

Rather than relaying the request 20, unchanged, to the destination server 16, the proxy server 12 is configured to modify the request 20 according to one or more predefined rules, forming a related request 22 which is then provided to the destination server 16. For example, the proxy server 12 may access a rules file, such as an Extensible Markup Language (XML) file stored in a memory 13 of the proxy server 12 (shown in FIG. 2), containing rules for how to modify certain requests 20. Alternatively, the proxy server 12 may modify the request 20 according to rules that are embedded in software executed by the proxy server 12, hardwired into the proxy server 12, or provided by an external server such as a policy function server 15 (also shown in FIG. 2). The policy function server 15 may, for example contain the policy, or rules, of each client 14 or destination server 16. For instance, the proxy server 12 may communicate with the policy function server 15 upon receiving a request 20 from a client 14 to determine the appropriate destination server 16 or other information required for forming and sending the related request 22.

The proxy server 12 may modify any part of the request 20 according to the one or more predefined rules that are applicable to the communication. For example, one such rule may instruct the proxy server 12 to convert any request 20 originating from a certain client 14 and destined for a certain destination server 16 into HTTPS format. Another rule may specify one or more changes to be made to the header of the request 20 to facilitate fulfillment of the request 20 by the destination server 16.

Referring back to the example, after the proxy server 12 has modified the request 20 received from the client 14, in this example the VRU, the proxy server 12 then provides the related request 22 to the destination server 16. In this way, the destination server 16 (in this case, the Call Agent) receives the substance of the original request 20, although the format of the request 20 may have been changed according to the predefined rules to promote a more accurate and reliable response from the destination server 16.

Similarly, the proxy server 12 is configured to receive a response 24 from the destination server 16 fulfilling the particular related request 22 and to modify the response 24 to form a related response 26 prior to providing the related response 26 to a recipient 18. Continuing the previous example, the proxy server 12 may receive a response 24 from the destination server 16 (the Call Agent) consisting of the long distance call records/IP session records requested. However, the response 24 may be communicated according to a protocol or in a format that is incompatible with the recipient 18. For example, the response 24 may have been transmitted using HTTPS, or the header may contain certain information that would render the entire response 24 meaningless to the recipient 18. Thus, as with the original request 20, the proxy server 12 is configured to modify any part of the response 24 according to one or more rules pertaining to the destination server 16 and the client 14 to create a related response 26 that is then provided to the recipient 18, which in this example may be a billing system. Once again, the recipient 18 receives the requested data in a usable form that is compatible with the recipient 18, regardless of the forms that were used to communicate the original request or response.

In some embodiments, a rule may instruct the proxy server 12 to form multiple related requests 22 based on the one request 20 received and to provide the related requests 22 to different destination servers 16, for example in an attempt to expedite fulfillment of the request 20 by dividing the required functionality among multiple destination servers. For instance, the proxy server 12 may be instructed by a particular rule to form two related requests 22, 22' based on one request 20 received from a client 14. Referring to FIG. 1, the rule may further specify that one of the related requests 22 be sent to destination server 16 and that the other related request 22' be sent to destination server 16'. The rule may further instruct the proxy server 12 on how to form a single related response 26 based on the two responses 24, 24' received from the two destination servers 16, 16'. As a result, the functionality required to fulfill the original request 20 may be split between destination server 16 and destination server 16' in a way that is transparent to the client 14, the destination servers 16, and the recipient 18.

Although FIG. 1 shows a request 20 originating from a client 14 that is different from the recipient 18 receiving the related response 26, such as when the request 20 is submitted by a VRU and the related response 26 is provided to a billing system, the proxy server 12 may be configured to provide the related response 26 to the client 14. Thus, the client 14 and the recipient 18 may be one and the same, such as if the client 14 is a laptop computer operated by a technician, and the recipient 18 is the same laptop computer.

Similarly, the proxy server 12 may be configured to provide the related response 26 to a recipient 18 other than the client 14 according to the predefined rules. For example, the proxy server 12 may be configured to determine whether a response 24 received from the destination server 16 is valid according to the predefined rules, and if the response 24 is invalid the proxy server 12 may be configured to provide the related response 26 to a particular recipient 18 other than the client 14. Alternatively, the proxy server 12 may be configured to provide the related response 26 to both the client 14 and one or more other recipients 18. For example, a proxy server 12 may determine that the long distance call records received from the Call Agent are not accurate, and thus invalid, according to the rules specifying the format of a valid call record. In this example, the proxy server 12 may, according to the rules, provide a related response 26 that is based on the invalid response 24 to a server at a technical help center rather than the client 14 (the VRU in this example) or the originally-specified recipient 18 (the billing system).

The proxy server 12 may also be configured to store one or more of the items of data communicated between the client 14 and the destination server 16, and the destination server 16 and the recipient 18. The proxy server 12 may be configured to store the request 20, the related request 22, the response 24, and/or the related response 26 in a database and to access the data stored in the database. In this way, if, for example, the proxy server 12 experiences a failure condition while attempting to communicate data between the client 14, the destination server 16, and the recipient 18, the proxy server 12 may be able to determine at which point in the communication the failure occurred and to provide any related requests 22 and related responses 24 that were not previously provided due to the failure. In other words, it would not be necessary for the proxy server 12 to receive a second request 20 from the client 14 in order to provide the related response 26 fulfilling the request 20 to the recipient 18. The database may be included in the proxy server 12 itself, such as in a memory 13 of the proxy server 12, or the database may be separate from the proxy server 12, for example located on an external database server 28, shown in FIG. 2.

Figure 2:
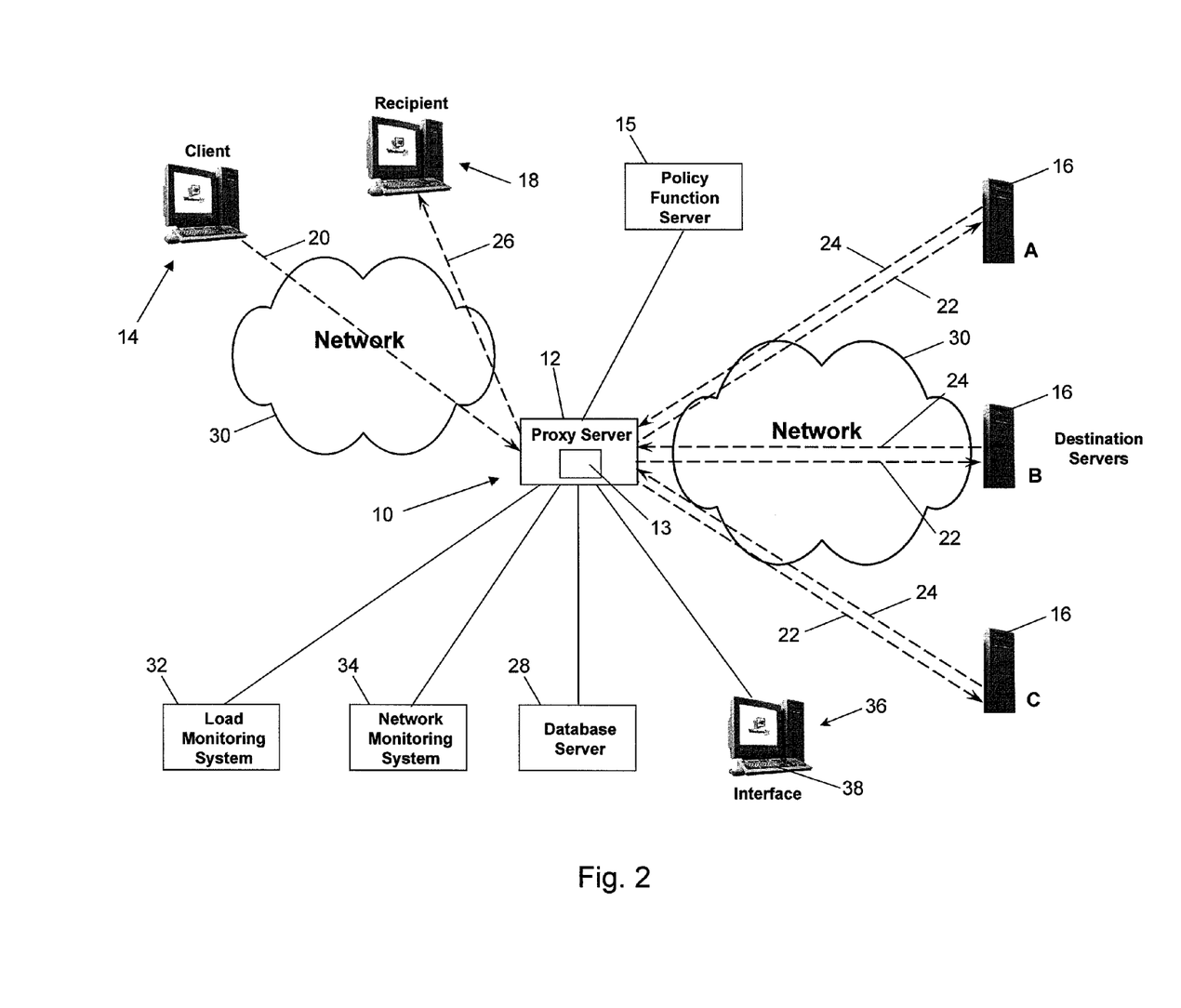
FIG. 2 is a schematic representation of one embodiment of the apparatus of FIG. 1 showing potential destination servers and external systems.

Referring to FIG. 2, the proxy server 12 may be configured to determine the destination server 16 that is to receive a particular related request 22 from among various potential destination servers 16 that are connected to a network. As previously mentioned, the proxy server 12 may determine the destination server 16 based on instructions provided in the request 20 itself. For example, a Uniform Resource Locator (URL) provided in the header of the request 20 may specify Destination Server A as the destination server 16 to receive the related request 22. Alternatively, the proxy server 12 may determine the destination server 16 according to one or more of the predefined rules. For example, a rule may provide that a related request 22 based on a request 20 originating from a certain client 14, such as a VRU, and requesting a certain file, such as long distance phone records, should be provided to Destination Server C.

The proxy server 12 typically directs the related request to one of a plurality of potential destination servers 16 and, as described below, to one of the potential destination servers that is currently designated as being active or otherwise available to service requests. As will also be described below, the potential destination servers that are designated from among the overall pool of potential destination servers may change over time depending upon connectivity and/or other factors. In this regard, the proxy server 12 may also be configured to no longer designate any one of the potential destination servers 16 to receive related requests 22 if the connection between the proxy server 12 and the particular potential destination server 16 is lost.

For example, the potential destination servers 16 connected to the network 30 in FIG. 2 and are currently designated are A, B, and C. Thus, any one of the potential destination servers 16 may receive a related request 22 as previously described. However, if a connection between, for example, Destination Server C and the proxy server 12 is impaired such that the proxy server 12 is unable to provide related requests 22 to C or to receive responses 24 from C, then Destination Server C may no longer be designated by the proxy server 12 as one of the potential destination servers 16 that may receive related requests 22 from the proxy server 12. In other words, in this example, if the connection between the proxy server 12 and C is lost, only potential destination servers A and B remain designated as candidates for receiving and servicing a related request 22. Thus, the proxy server 12 can select one of the designated potential destination servers A or B to receive the related request 22.

The proxy server 12 may also be configured to attempt to re-establish the connection between the proxy server 12 and the respective potential destination server 16 that had previously lost its connection (C in the previous example). If the connection is restored, the proxy server 12 may then re-designate the respective potential destination server 16 (i.e., server C). In other words, once an attempt by the proxy server 12 to re-establish a lost connection is successful, then the proxy server 12 may resume consideration of the respective potential destination server as a destination server 16 for receiving related requests 22 provided by the proxy server 12.

The proxy server 12 may be configured to attempt to re-establish a lost connection at predefined time intervals. For example, the proxy server 12 may transmit a query to the potential destination server 16 with which the connection was lost, such as C, every five minutes and look for a response to determine whether the connection has been re-established. Alternatively, the proxy server 12 may periodically receive a signal from each potential destination server 16 with which the proxy server 12 is connected, such that receiving a signal from a previously disconnected potential destination server 16 (C in the previous example) indicates that the connection has been re-established and the respective potential destination servers 16 should be re-designated.

In some embodiments, the proxy server 12 may be configured to generate an alarm if a connection between the proxy server 12 and the destination server 16 is lost. The alarm may be a visual indication that the connection with the destination server 16 is impaired, such as a light or a flashing image on a display, or an auditory indication, such as a beep or a ring at the site of the proxy server 12 or any other location, such as at the office of a responsible technician or a network operations center. The alarm may also include a description of the event, such as the date and time when the connection was lost, the particular destination server 16 involved, and any consequences of the lost connection, such as an error condition reported in a related response 26 provided to a recipient 18 or a failure of the transaction. Similarly, the proxy server 12 may be configured to generate an alarm to indicate the loss of a connection with any one of the potential destination servers, even those that are not currently involved in a transaction.

The proxy server 12 may be configured to receive load data for a number of potential destination servers 16. Furthermore, the proxy server 12 may be configured to determine the destination server 16 that is to receive a particular related request 22 from among the various potential destination servers 16 based on the load data received and according to the predefined rules. Referring to FIG. 2, the proxy server 12 may receive data regarding the load on the potential destination servers 16 (i.e., A, B, and C) from a load monitoring system 32. For example, the load monitoring system 32 may monitor the number of related requests 22 provided to each destination server 16 by the proxy server 12, as well as other demands made on each destination server 16 by other sources, such as other proxy servers or clients.

The proxy server 12 may, for example, receive load data indicating a high load on Destination Server B. In addition, one of the predefined rules pertaining to Destination Server B and applicable to the particular request 20 involved may instruct the proxy server 12 to provide related requests 22 to Destination Server A when there is a load on B that exceeds a certain level. As a result, the proxy server 12 would provide the related request 22, which was originally destined for Destination Server B, to Destination Server A, based on the load data received and the instructions specified in the pertinent rules. The load monitoring system 32 may also recognize destination servers 16 that are under-loaded so that the proxy server 12 may distribute some of the related requests 22 to the under-loaded destination servers 16, according to the predefined rules, to promote balanced loading of the network 30.

Similarly, the proxy server 12 may be configured to receive data regarding one or more conditions of a network 30 to which a number of potential destination servers 16 are connected and to determine the destination server 16 based on the data and according to the predefined rules. For example, the proxy server 12 may receive data from a network monitoring system 34 that monitors certain network conditions, such as errors experienced by network elements (i.e., servers, routers, etc.), impaired connections between network elements, and power outages, to name a few. Considering the configuration of FIG. 2 as an example, the proxy server 12 may receive data from the network monitoring system 34 indicating that Destination Server A is experiencing an error condition and is not responsive. Based on this data and the instructions provided in the relevant rules, the proxy server 12 may provide some of the related requests 22 that were originally destined for Destination Server A to Destination Servers B or C.

The apparatus 10 for communicating data may include an interface 36 in addition to the proxy server 12, as shown in FIG. 2. The interface 36 may be configured to receive one or more inputs for modifying the predefined rules. For example, the interface 36 may include an input device 38, such as a keyboard (shown in the figures) or a mouse, to allow a technician to manipulate a rules file containing the one or more rules used by the proxy server 12 to provide related requests 22 and related responses 26 to destination servers 16 and recipients 18, respectively. The technician may, for example, change one of the rules to specify the provision of related requests 22 to Destination Server C instead of Destination Server B in case of an error condition of Destination Server A. Likewise, the technician may delete one or more rules or include additional rules to be considered by the proxy server 12. Furthermore, the proxy server 12 may be configured to communicate periodically with the interface 36, such as every 60 seconds, to check for rule modifications and to update the predefined rules (i.e., replacing the old rules with the new, modified rules) without interrupting the provision of related requests 22 and related responses 26. In this way, the provision of a related request 22 to a destination server 16 that is in progress, for example, would not be impaired by the modification and update of the predefined rules.

Figure 3:
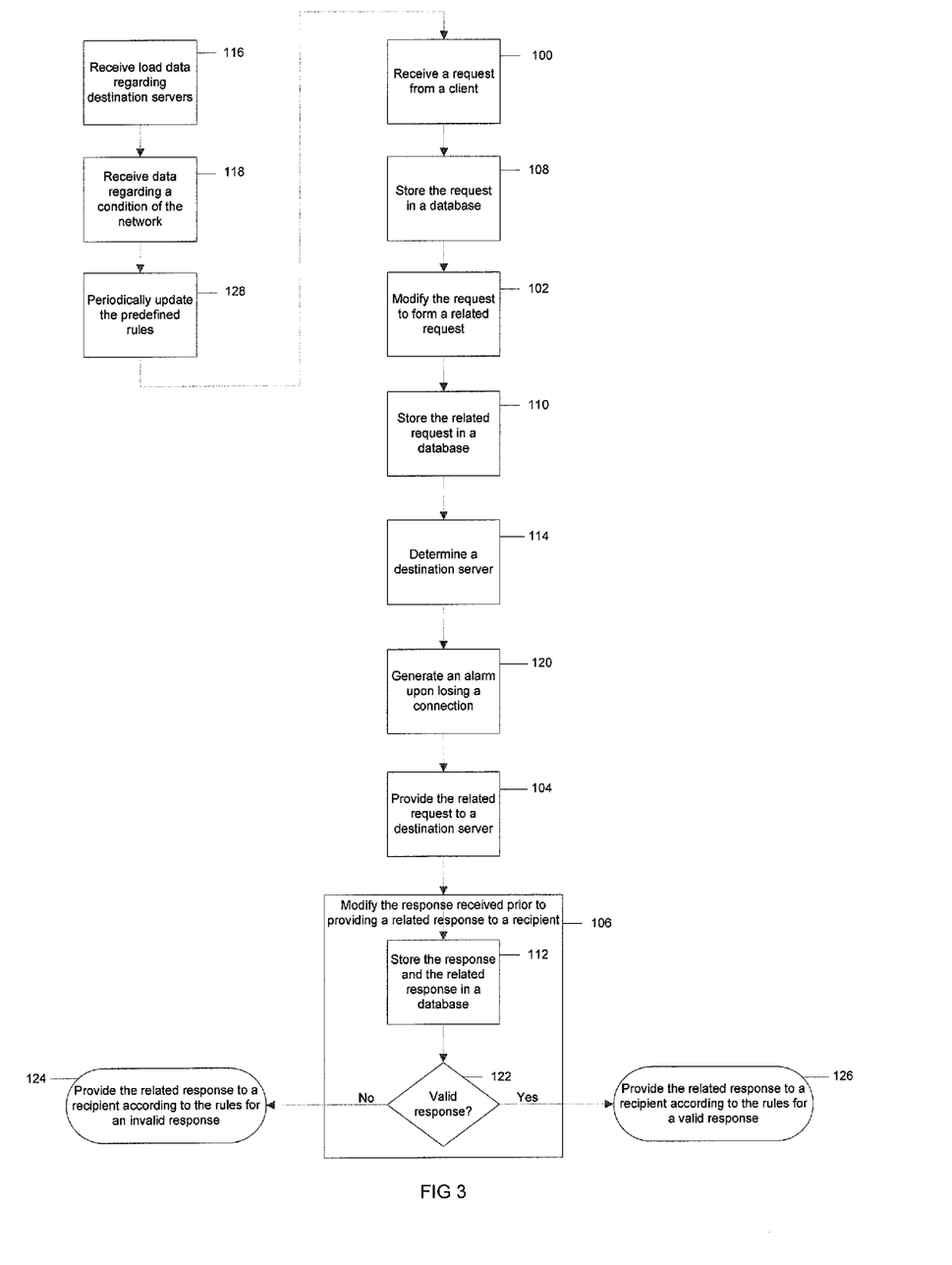
FIG. 3 is a flow chart illustrating embodiments of a method of transferring data among clients, destination servers, and recipients.

In other embodiments, a method for transferring data among clients, servers, and recipients is provided. Referring to FIG. 3, a request is initially received from a client to be provided to a destination server. The request is then modified according to one or more predefined rules to form a related request, as described above, and the related request is provided to the destination server. The response from the destination server is then modified to form a related response, which is provided to a recipient. See FIG. 3, blocks 100-106.

The various items of data that are transferred among the clients, destination servers, and recipients may be stored in a database. For example, the request that is received from a client, the related request that is formed based on the application of predefined rules to the original request, the response received from the destination server, and the related response may be stored in a database. See blocks 108-112. In this way, the database may be accessed to retrieve the data if necessary to provide any related requests and related responses that were not previously provided, for example as a result of the failure of a proxy server 12 receiving requests and responses and providing related requests and related responses.

A destination server, to which related requests will be provided and from which responses will be received, may be determined in various ways from among a number of potential destination servers that are currently designated to receive related requests. See block 114. For example, the destination server may be specified in the request from the client, such as in the form of a URL. Alternatively, or in addition to being specified in the request, data may be received which, in conjunction with the relevant predefined rules, may serve as an input for determining the destination server. See blocks 116 and 118. Although FIG. 3 shows the load data and the data regarding a condition of the network as being received prior to the receipt of a request from a client, the data may be received at any point prior to the determination of a destination server in block 114.

For example, load data regarding the load distribution among a number of potential destination servers may be received (block 116), and the destination server may be determined based on the load data and according to the relevant predefined rules. As another example, data regarding at least one condition of a network, such as errors in the network, impaired connections, or power outages, may be received (block 118) and may likewise inform the determination of the destination server according to the relevant rules.

In addition, a designation of any of the potential destination servers may be removed if the connection to the respective server is lost, for example if it is no longer possible to communicate with the respective server. As a result, related requests would not be provided to a potential destination server with which the connection has been lost. However, attempts may be made to re-establish the lost connection, such as attempts to communicate with the respective server made at certain time intervals, as previously described. In this way, if the connection is re-established, the respective server may be re-designated such that future related requests may be provided to the re-designated destination server. Other data not mentioned here or combinations of data may also be used to determine the destination server, and in some cases a determination based on such data may override other determinations of the destination server, such as a determination based on the destination server specified in the request itself.

Furthermore, an alarm may be generated upon the loss of a connection with the destination server. See block 120. The alarm may be visual or auditory and may optionally include a description of the event that triggered the alarm, as previously discussed. In addition, the alarm may be generated at any location, such as the location of the proxy server 12 or the location of a responsible technician. Although FIG. 3 shows the alarm being generated following the determination of a destination server, the alarm may be generated at any time during the transfer of data between the client and the destination server or between the destination server and the recipient. Similarly, an alarm may be generated to indicate the loss of a connection with any one of the potential destination servers, even those that are not currently involved in a transaction.

The rules may specify that two or more related requests be formed based on the request received, and each related request may be provided to a different destination server for fulfilling a portion of the request. The responses to the multiple related requests may then be assembled to form the related response, which may be provided to the recipient, as previously described. In this way, the required functionality for fulfilling the request may be divided among multiple destination servers.

The validity of a response received from the destination server may also be determined according to the relevant rules, as shown in block 122. For example, the rules pertaining to responses received from a particular destination server may specify that any response containing certain header information is invalid. If the response is determined to be invalid, the related response may be provided to a recipient according to the relevant rules. See block 124. For example, the rules may specify that a recipient other than the client should receive a related response based on a response determined to be invalid. Similarly, if the response received from the destination server is valid, then the related response may be provided to the recipient according to the rules relevant in that situation. See block 126.

The predefined rules may be updated periodically without interrupting the provision of related requests and related responses. See block 128. Although block 128 shows the update occurring before a request is received from a client, the rules may be updated at any point. For example, the rules may be updated every 60 seconds, regardless of the stage of data transfer between the client and the destination server and between the destination server and the recipient.

It is understood that the operations described for the illustrated methods of FIG. 3 may be performed through hardware, software, or combination thereof. Therefore embodiments may take the form of hardware systems and/or apparatuses, software, or combinations thereof. As an example, embodiments may include a computer program product that includes a computer-readable storage medium (e.g., memory) and one or more executable portions (e.g., software) stored by the computer-readable storage medium for performing the operations described herein upon execution thereof. Referring to FIG. 2, for example, the executable portions may be stored in a memory 13 of the proxy server 12 or otherwise accessible by the proxy server 12 such that the proxy server 12 may access and execute the executable portions of the computer program product in order to perform the functions described herein including, for example, those depicted in FIG. 3.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A system comprising:
a memory device to store instructions; and
a proxy server device to execute the instructions to:
receive load data for respective loads of a plurality of destination server devices,
the plurality of destination server devices being different from the proxy server device,
receive network connection status data related to a status of respective connections to the plurality of destination server devices,
receive a request from a client device,
the request being associated with a first format of a plurality of formats, and
the request being directed to a first destination server device of the plurality of destination server devices,
select, according to at least one predefined rule and based on the client device, the load data, the network connection status data, and contents of the request, a second destination server device of the plurality of destination servers devices,
the first destination server device being different from the second destination server device,
modify the received request, according to the at least one predefined rule, to form a related request associated with a second format of the plurality of formats,
the second format being different from the first format, and
the second format being selected from the plurality of formats based on the client device and the second destination server device,
provide, via the network, the related request to the second destination server device,
receive, via the network, a response to the related request from the second destination server device,
the response being associated with a third format of the plurality of formats,
determine, based on the at least one predefined rule and the third format, whether the response is invalid,
identify, based on the at least one predefined rule, a recipient device that is different from the client device when the response is invalid,
modify the response, according to the at least one predefined rule and when the response is invalid, to form a related response associated with a fourth format of the plurality of formats,
the fourth format being different from the third format, and
the fourth format being selected from the plurality of formats based on the recipient device, and
provide the related response to the recipient device when the response is invalid.

2. The system of claim 1,
where the proxy server device is further to:
provide the related response to the client device.

3. The system of claim 1, where the proxy server device is further to:
store, in the memory device, at least one of the related request or the related response; and
access the memory device when providing the at least one of the related request or the related response.

4. The system of claim 1,
where the network connection status data indicates that a connection, between the proxy server device and one of the plurality of destination server devices, is lost, and
where the proxy server device, when selecting the second destination server device, is further to:
initiate a process to re-establish the connection between the proxy server and the one of the plurality of destination server devices, and
prevent the one of the plurality of destination server devices from being selected as the second destination server device until the process to re-establish the connection is completed.

5. The system of claim 4, where the proxy server device, when initiating the process to re-establish the connection, is further to attempt to re-establish the connection at predefined time intervals.

6. The system of claim 1,
where the proxy server device, when selecting the second destination server device, is further to select at least two destination server devices of the plurality of destination server devices,
where the proxy server device, when modifying the received request, is further to form at least two related requests, based on the request and according to the at least one predefined rule,
where the at least two related requests are associated with at least two respective portions of the request,
where each of the at least two related requests is formatted for a respective one of the at least two destination server devices,
where the proxy server device, when providing the related request, is further to provide each of the at least two related requests to the respective one of the at least two destination server devices,
where the proxy server device, when receiving the response, is further to receive at least two related responses from the at least two destination server devices, and
where the proxy server device, when modifying the received request, is to form the related response based on the at least two related responses.

7. The system of claim 1,
where the proxy server device is further to:
receive data regarding at least one condition of the network,
where the at least one condition of the network does not relate to the load data or the network connection status data, and
where the proxy server device, when selecting the second destination server device, is further to determine, according to the at least one predefined rule, the second destination server device based on the received data regarding the at least one condition of the network.

8. The system of claim, 1 further comprising:
an interface to receive at least one input to modify the at least one predefined rule,
where the proxy server device is further to:
   communicate intermittently with the interface; and
   when the at least one predefined rule has been modified, update the at least one predefined rule without interrupting the providing of the related request and the providing the related response.

9. A method comprising:
storing, by one or more server devices:
   at least one predefined rule,
   load data for each of a plurality of destination servers, and
   connection status data related to a status of a connection, over a network, of each of the plurality of destination servers;
storing, by the one or more server devices, a request from a client device and intended for a first destination server, the request being in a first format of a plurality of formats;
selecting, by the one or more server devices, a second destination server from the plurality of destination servers,
   the second destination server being selected according to the at least one predefined rule and based on contents of the request, the load data, and the connection status data,
   the second destination server being different from the first destination server, and
   the one or more server devices being different from the first destination server and the plurality of destination servers;
modifying, by the one or more server devices, the request to form a related request,
   the related request being in a second format, of the plurality of formats, that differs from the first format, and
   the second format being selected from the plurality of formats according to the at least one predefined rule and based on the second destination server;
providing, by the one or more server devices, the related request to the second destination server;
receiving, by the one or more server devices and from the second destination server, a response to the related request,
   the received response being in a third format of the plurality of formats;
determining, by the one or more server devices and based on the at least one predefined rule and the third format, whether the received response is invalid;
identifying, by the one or more server devices, a recipient device that is different from the client device when the response is invalid,
   the recipient device being identified according to the at least one predefined rule, the stored request, and contents of the received response;
modifying, via the one or more server devices and when the received response is invalid, the received response to form a related response,
   the related response being in a fourth format, of the plurality of formats, that differs from the third format, and
   the fourth format being selected from the plurality of formats according to the at least one predefined rule and based on the recipient device; and
providing the related response to the recipient device when the response is invalid.

10. The method of claim 9, further comprising:
storing at least one of the related request or the related response in a memory; and
accessing the memory when providing at least one of the related request or the related response.

11. The method of claim 9, where selecting the second destination server further includes:
determining the second destination server from among two or more of the plurality of destination servers that are currently designated to receive related requests;
undesignating one of the designated two or more of the plurality of destination servers for which the associated connection is lost;
attempting to re-establish the associated connection to the undesignated one of the plurality of destination servers; and
re-designating the undesignated one of the plurality of destination servers to receive related requests when the connection is re-established.

12. The method of claim 9,
where selecting the second destination server further includes selecting at least two destination servers of the plurality of destination servers,
where modifying the request further includes forming at least two related requests,
where providing the related request further includes providing each of the at least two related requests to each of the at least two selected destination servers to fulfill a respective one of at least two portions of the request, and
where modifying the received response further includes forming the related response based on responses to the at least two related requests received from the at least two selected destination servers.

13. The method of claim 9, further comprising:
receiving data regarding at least one condition of a network to which the plurality of destination servers are connected,
   where the least one condition of the network does not relate to the load data or the connection status data, and
   where selecting the second destination server includes determining the second destination server based on the received data and according to the at least one predefined rule.

14. The method of claim 9, further comprising:
periodically updating the at least one predefined rule without interrupting the providing of the related request and the providing of the related response.

15. A non-transitory computer-readable storage medium storing instructions, the instructions comprising:
one or more instructions which, when executed by a computer device, cause the computer device to receive a request from a client device to be relayed to a first destination server of a plurality of destination servers,
   the request being in a first format, of a plurality of formats, associated with the first destination server;
one or more instructions which, when executed by the computer device, cause the computer device to determine, according to at least one predefined rule and based on contents of the request, load data for each of a plurality of destination servers, and connection status data related to a status of respective connections, over a network, to the plurality of destination servers, to not forward the request to the first destination server;

one or more instructions which, when executed by the computer device, cause the computer device to redirect, when determining not to forward the request to the first destination server, to a second destination server, of the plurality of destination servers, that differs from the first destination server, the one or more instructions to redirect the request to the second destination server including:

one or more instructions to select the second destination server from the plurality of destination servers, the second destination server being selected according to the at least one predefined rule and based on the contents of the request, the load data for each of a plurality of destination servers, and the connection status data related to a status of respective connections, over the network, to the plurality of destination servers, one or more instructions to modify the request according to at least one predefined rule to form a related request, the related request being in a second format, of the plurality of formats, that differs from the first format, and the second format being associated with the second destination server, and one or more instructions to provide, over the network, the related request to the second destination server;

one or more instructions which, when executed by the computer device, cause the computer device to receive, from the second destination server, a response to the related request, the response being in a third format of the plurality of formats;

one or more instructions which, when executed by the computer device, cause the computer device to determine, based on the at least one predefined rule and the third format, whether the response is invalid;

one or more instructions which, when executed by the computer device, cause the computer device to select a recipient device that is different from the client device when the response is invalid;

one or more instructions which, when executed by the computer device, cause the computer device to modify, based on the recipient device and when the response is invalid, the response to form a related response, the related response being in a fourth format, of the plurality of formats, that differs from the third format, and the fourth format being associated with the recipient device; and one or more instructions which, when executed by the computer device, cause the computer device to provide the related response to the selected recipient device when the response is invalid.

16. The non-transitory computer-readable medium of claim 15, where the instructions further comprise:

one or more instructions to store at least one of the related request or the related response.

17. The non-transitory computer-readable medium of claim 15, where the one or more instructions to select the second destination server further include:

one or more instructions to select the second destination server from among a plurality of designated destination servers that are currently designated to receive related requests;

one or more instructions to remove a designation of one, of the plurality of designated destination servers, which is associated with, based on the connection data, a lost connection;

one or more instructions to attempt to re-establish the lost connection; and one or more instructions to re-designate the one destination server as one of the designated destination serves that will receive related requests, when the lost connection is re-established.

18. The non-transitory computer-readable medium of claim 15, where the instructions further comprise:

one or more instructions to receive data regarding at least one condition of a network to which the plurality of destination servers are connected, where the least one condition of the network does not relate to the load data or the connection status data, and where the one or more instructions to select the second destination server further include:

one or more instructions to determine the second destination server further based on the received data regarding the at least one condition of the network and according to the at least one predefined rule.

19. The non-transitory computer-readable medium of claim 15, where the instructions further comprise:

one or more instructions to update the at least one predefined rule without interrupting the providing of the related request and the providing of the related response.

20. The system of claim 1, where the first format and the fourth format include Hypertext Transfer Protocol (HTTP), and where the second format and the third format include Hypertext Transfer Protocol Secure (HTTPS).

21. The method of claim 9, where the first format and the fourth format include Hypertext Transfer Protocol (HTTP), and where the second format and the third format include Hypertext Transfer Protocol Secure (HTTPS).

22. The non-transitory computer-readable medium of claim 15, where the first format and the fourth format include Hypertext Transfer Protocol (HTTP), and where the second format and the third format include Hypertext Transfer Protocol Secure (HTTPS).

23. The method of claim 9, further comprising:

providing the related response to the client device.

24. The non-transitory computer-readable medium of claim 15, where the instructions further comprise:

provide the related response to the client device.

* * * * *